US010027759B2

(12) United States Patent
Shannir (10) Patent No.: US 10,027,759 B2
(45) Date of Patent: Jul. 17, 2018

(54) VEHICLE HUMAN-MACHINE INTERFACE (HMI) DEVICE OPERATION OF A HANDHELD MOBILE DEVICE

(71) Applicant: Toyota Motor Engineering & Manufacturing North America, Inc., Erlanger, KY (US)

(72) Inventor: Steven H. Shannir, Dearborn, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 144 days.

(21) Appl. No.: 15/229,748

(22) Filed: Aug. 5, 2016

(65) Prior Publication Data

US 2018/0041584 A1 Feb. 8, 2018

(51) Int. Cl.
*H04L 29/06* (2006.01)
*H04L 29/08* (2006.01)
(Continued)

(52) U.S. Cl.
CPC .......... *H04L 67/125* (2013.01); *G05B 19/409* (2013.01); *H04L 63/0876* (2013.01);
(Continued)

(58) Field of Classification Search
CPC .. H04L 67/125; H04L 63/0876; H04W 12/08; H04W 12/06; G05B 19/409; G05B 2219/33192
See application file for complete search history.

(56) References Cited

U.S. PATENT DOCUMENTS 8,700,252 B2 * 4/2014 Ubik ................... G07C 5/008
701/29.1
9,008,856 B2 * 4/2015 Ricci ..................... G06F 9/54
455/404.1
(Continued)

FOREIGN PATENT DOCUMENTS

EP 3021563 A2 5/2016

OTHER PUBLICATIONS

Jan Sonnenberg, "A distributed in-vehicle service architecture using dynamically created Web Service", 2010 IEEE 14th International Symposium on Consumer Electronics, Retrieved From http://ieeexplore.ieee.org/abstract/document/5523715/, Published Jun. 2010. (Year: 2010).*

(Continued)

*Primary Examiner* — Chau Le
(74) *Attorney, Agent, or Firm* — Christopher G. Darrow; Darrow Mustafa PC (57) ABSTRACT

A method and device for providing original equipment manufacturer (OEM) human-machine interface (HMI) device operation of a non-OEM handheld mobile device is provided. The method and/or device operate to process an access request received via a vehicle network, and transmits, in response to the access request, a HMI configuration request that corresponds to the OEM HMI device. The method and/or device receive, in response to the HMI configuration request, a HMI mapping assignment that corresponds with the OEM HMI device, and applies the HMI mapping assignment to OEM HMI device data to produce non-OEM HMI data, in which the OEM HMI device data being operable to manipulate at least one application function of the non-OEM handheld mobile device.

20 Claims, 6 Drawing Sheets messaging diagram 300

(51) Int. Cl.
*G05B 19/409* (2006.01)
*H04W 4/00* (2018.01)
*H04W 12/06* (2009.01)
*H04W 12/08* (2009.01)
*H04W 4/80* (2018.01)

(52) U.S. Cl.
CPC ............. *H04W 4/008* (2013.01); *H04W 4/80* (2018.02); *H04W 12/06* (2013.01); *H04W 12/08* (2013.01); *G05B 2219/33192* (2013.01)

(56) References Cited

U.S. PATENT DOCUMENTS

| | | | |
|---|---|---|---|
| 2003/0119566 A1* | 6/2003 | Chen | H04M 1/6083 455/569.2 |
| 2005/0281414 A1* | 12/2005 | Simon | G11B 19/022 381/86 |
| 2009/0094348 A1* | 4/2009 | Miura | H04L 12/2803 709/219 |
| 2010/0220250 A1* | 9/2010 | Vanderwall | G01C 11/02 348/837 |
| 2010/0248694 A1* | 9/2010 | Suzuki | H04M 1/6091 455/413 |
| 2013/0073958 A1 | 3/2013 | Tom | |
| 2013/0179029 A1* | 7/2013 | Wang et al. | |
| 2013/0190978 A1* | 7/2013 | Kato et al. | G01C 21/3664 701/36 |
| 2014/0118222 A1 | 5/2014 | Barrett et al. | |
| 2015/0192426 A1* | 7/2015 | Foster | G01C 21/3629 715/765 |
| 2015/0223032 A1* | 8/2015 | Nespolo | H04W 4/12 701/2 |
| 2015/0249578 A1 | 9/2015 | Bothe | |
| 2016/0142867 A1 | 5/2016 | Kim et al. | |
| 2016/0174275 A1* | 6/2016 | Ji | H04M 1/72527 455/422.1 |
| 2018/0041628 A1* | 2/2018 | Shannir | H04M 1/72577 |

OTHER PUBLICATIONS

Welch, "This Honda concept replaces the car's head unit with a smartphone", The Verge, Feb. 23, 2016, 3 pages.
youtube.com, "DrivemodeCar 2.0 Demo", Retrieved from the Internet: <https://www.youtube.com/watch?v=WhMdAmSJfJQ>, Retrieved Jun. 7, 2016, Published Feb. 12, 2016, 1 page.
youtube.com, "Drivemode with Wireless Remote Controller", Retrieved from the Internet <https://www.youtube.com/watch?v=D3vUVOPhYuQ>, Retrieved Jun. 7, 2016, Published Jan. 13, 2016, 1 page.

* cited by examiner

FIG. 1

FIG. 3
messaging diagram 300

| device field 402 | input field 404 | audio application mode 422 | vehicle application mode 424 | application mode *nnn* | OEM data field 408 | non-OEM data field 410 |
|---|---|---|---|---|---|---|
| | volume control toggle inputs 116 | volume control | scroll display | function_01 | OEM_01 | non_OEM_01 |
| OEM HMI device 104 | mode button 112 | application selection | application selection | function_02 | OEM_02 | non_OEM_02 |
| | back switch 113 | return to previous | previous display | function_03 | OEM_03 | non_OEM_03 |
| | cursor switch 114 | app field selection | app field selection | function_04 | OEM_04 | non_OEM_04 |
| | enter switch 115 | select/voice command | select/voice command | function_05 | OEM_05 | non_OEM_05 | applied HMI mapping assignment 318

HMI mapping assignment 316

VEHICLE HUMAN-MACHINE INTERFACE (HMI) DEVICE OPERATION OF A HANDHELD MOBILE DEVICE

BACKGROUND

Vehicles have been incorporating technological advances, including implementation of controller devices for improving vehicle performance, such as fuel economy, ride characteristics, driver-assist features, etc. Although vehicles have been improving with the technological advances, including in-vehicle infotainment, personal electronic devices such as smartphones, tablets, phablets, etc., have also experienced technological advances, providing consumer demand for portable communication and infotainment features. It is desirable that personal electronic devices be available for vehicle infotainment use, and be interoperable with existing vehicle human-machine interface devices.

SUMMARY

A device and method for vehicle human-machine interface (HMI) device operation by a handheld mobile device are disclosed.

In one implementation, a method for providing original equipment manufacturer (OEM) human-machine interface (HMI) device operation of a non-OEM handheld mobile device is provided. The method includes processing an access request received via a vehicle network. A HMI control unit transmits, in response to the access request, a HMI configuration request that corresponds to the OEM HMI device. The HMI control unit receives, in response to the HMI configuration request, a HMI mapping assignment that corresponds with the OEM HMI device. The HMI control unit applies the HMI mapping assignment to OEM HMI device data to produce non-OEM HMI data, in which the OEM HMI device data being operable to manipulate at least one application function of the non-OEM handheld mobile device.

In another implementation, a method for providing original equipment manufacturer (OEM) human-machine interface (HMI) device connectivity with a non-OEM handheld mobile device is disclosed. The method includes coupling the non-OEM handheld mobile device with a vehicle network, and transmitting, by the non-OEM handheld mobile device via the vehicle network, an access data request. The data request includes authentication data to authenticate access by the non-OEM handheld mobile device to vehicle network data. The non-OEM handheld mobile device receives, in response to the access request, a human-machine interface (HMI) configuration request based on a user input capability of the OEM HMI device, and transmits in response a HMI functional mapping assignment that corresponds with the user input capability of the OEM HMI device, such that the OEM HMI device being operable to manipulate at least one application function of the non-OEM handheld mobile device.

In another implementation, a human machine interface (HMI) control unit is disclosed. The HMI control unit including a wireless communication interface, a processor, and a memory. The wireless communication services communication with a vehicle network. The processor is coupled to the wireless communication interface, and controls operations of the HMI control unit. The memory is coupled to the processor, and is for storing data and program instructions used by the processor, the processor being configured to execute instructions stored in the memory to receive an access request via the vehicle network, and transmit, in response to the access request, a human-machine interface (HMI) configuration request that corresponds to the OEM HMI device. The processor receives, in response to the HMI configuration request, a HMI mapping assignment that corresponds with the OEM HMI device, and applies the HMI mapping assignment to OEM HMI device data, in which the OEM HMI device data being operable to manipulate at least one application function of the non-OEM handheld mobile device.

BRIEF DESCRIPTION OF THE DRAWINGS

The description makes reference to the accompanying drawings wherein like reference numerals refer to like parts throughout the several views, and wherein.

DETAILED DESCRIPTION

Head unit displays may not be as user-friendly, configurable, or as powerful as user handheld devices. Head unit technology may become outdated over the lifetime of a vehicle. Also, vehicle users may seek to replace their original-equipped head units with tablets, phablets, smart phones, etc., which may be updated with different applications (as selected by a user), including functional apps, gaming apps, audio/visual playback, and the like. When a head unit may become outdated (or may stop working over extended use), a vehicle user generally has the limited alternative of replacing the original device with a third party replacement part.

Unless replacement parts are original equipment manufacturer (OEM) devices, the replacement parts may not have access to the vehicle's human-machine interface (HMI) devices, such as existing HMI devices located on the steering wheel, and generally about the periphery of a head unit device. Because a non-OEM replacement device may not have access to a vehicle's network, the non-OEM replacement device may not be capable of accessing vehicle sensor data or other vehicle inputs.

Figure 1:
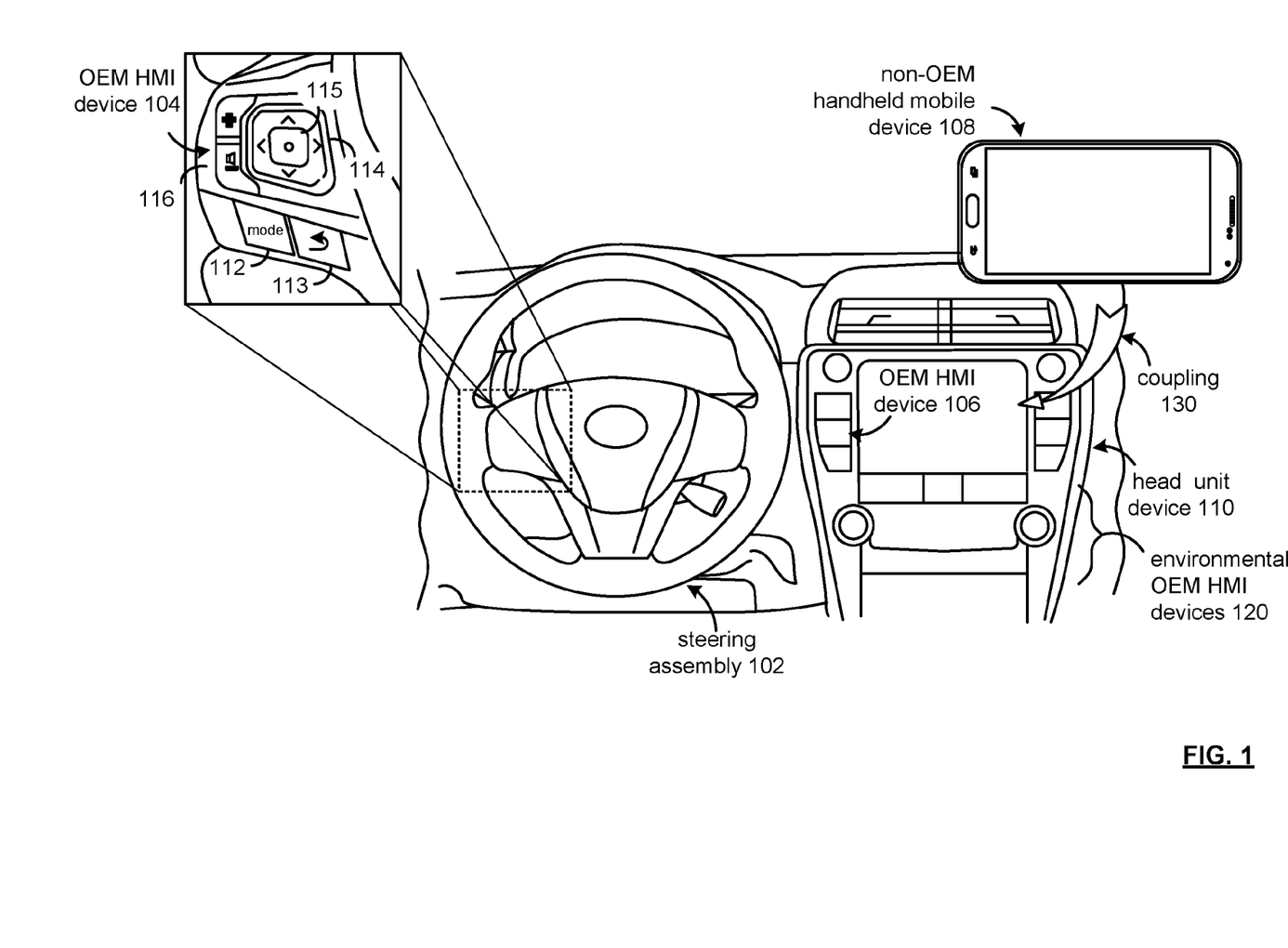
FIG. 1 shows a plan view of a vehicle steering assembly and head unit device.

FIG. 1 is a plan view of a vehicle steering assembly 102 and head unit device 110. The steering assembly 102 may include an original equipment manufacturer (OEM) human-machine interface (HMI) device 104, which may function to manipulate controls of vehicle devices, such as those of the head unit device 110.

The head unit device 110 may include OEM HMI device 106, which may function to also manipulate controls of vehicle devices, such as those of the head unit device 110, and may also include environmental OEM HMI devices 120 for vehicle environmental control, such as driver/passenger temperature settings, blower speed, recirculation setting, temperature sensing display, etc.

As may be appreciated, in the context of vehicle manufacture, original equipment manufacturer (OEM) devices may generally refer to those parts assembled and installed during new vehicle construction. Various manufacturers may provide these devices to the specifications and requirements of the final vehicle assembly, and may have a relationship with the original vehicle manufacturer, and accordingly, have access to operational and/or functional specifications for device integration.

In contrast, aftermarket, or non-OEM devices, are those made by manufacturers other than the OEM, and may be installed as replacements for after-factory assembly. Non-OEM manufacturers may not have access to the specifications and requirements of the original vehicle manufacturer, and accordingly, non-OEM devices may not have the capacity to integrate with vehicle OEM devices.

With the example of the OEM HMI device 104, the term human-machine interface (HMI) refers to the manner a human, such as a vehicle operator and/or passenger, interacts with a machine, such as a vehicle and/or vehicle components therein. A vehicle, generally, may include numerous HMI devices. These HMI devices may in turn provide components for a vehicle supervisory control and data acquisition (SCADA) system, a distributed control system (DCS), etc., as may be used for vehicle automation and control.

The OEM HMI device 104 may include volume control toggle inputs 116, a mode button 112, a back switch 113, a cursor switch 114, and enter switch 115. As originally configured, by way of example, the volume control toggle inputs 116 may operate to increase/decrease volume. The mode button 112 may operate to change an audio/video data source (air, satellite, USB files, compact disc, etc.). The back switch 113 may operate to returns a head unit display to a previous screen. The cursor switch 114 may operate to select audio/video data within an source (as may be selected by the mode button 112), such as a radio station, a radio preset, a compact disc track, an audio/visual file, individual songs, etc. The OEM HMI device 106 of the head unit device 110 may include similar operations and/or functions with respect to the OEM HMI device 104, and may be accessible by a passenger of the vehicle, as wheel as by the vehicle driver.

Referring to the example of FIG. 1, a non-OEM handheld mobile device 108 may replace the display unit of the head unit device 110, and upon arriving at a destination, may be taken with the vehicle user when they exit the vehicle. As another feature, a non-OEM handheld mobile device 108, being portable and configured to interact with first vehicle, may also be used with license and/or access permissions to provide similar infotainment and device app functionality in other vehicles of similar vehicle manufacturers, and may also in dissimilar vehicle manufacturers (across vehicle brands, as well as across passenger or non-passenger vehicles such as, for example, a terrestrial, aquatic, and/or airborne vehicle.

In effect, the non-OEM handheld mobile device 108 may be docked and/or coupled 130 on a wired and/or wireless basis with a vehicle network, and provide functionality associated with a head unit device 110, as well as provide additional functionality via the non-OEM handheld mobile device 108.

The head unit device 110 may provide a receiver platform configured for various non-OEM handheld mobile devices 108, such as notebook computers, laptop computers, tablets, phablets, and/or smartphone operation in a vehicle, and to further replace OEM head unit devices for the vehicle. The docking platform may mimic a flush and/or planar design of an OEM head unit device 110, while may also provide other configurations, such as an adjustable armature, a vehicle desk or rack platform to permit positioning the non-OEM handheld mobile device 108 in a convenient and ergonomic position. Also, the coupling configuration may include aspects that allow a quickly and easily dock and undock the non-OEM handheld mobile device 108. A docking platform may include a docking station to receive and/or cradle the non-OEM handheld mobile device 108.

Also, as may be appreciated by one of skill in the art, a non-OEM handheld mobile device 108 may provide additional function and configuration capabilities over those that may be present in an OEM head unit device 110.

The non-OEM handheld mobile device 108 may be a third-party device, such as a smartphone, tablet, phablet (that is, smartphone having a screen of intermediate size between a smartphone and a tablet computer), etc. Non-OEM handheld mobile devices may provide expanded functionality such as always-listening function for voice commands, active display functions for illuminating individual pixels for new notifications (e.g., email, text, updates, etc.), location-based reminder functionality, etc.

Operational features of a non-OEM handheld mobile device 108 may include a megapixel camera with high-definition (HD) video capture, high-definition (HD) output to an external monitor (or to the device display), FM radio capability, music file player capability, digital living network alliance (DLNA) support for media sharing.

With respect to wireless communication, the device 108 may include cellular voice/data capability under various communications standards specifications. wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, Near Field Communication (NFC), IEEE 802.11, Bluetooth, AMPS (advanced mobile phone services), digital AMPS, GSM (global system for mobile communications), CDMA (code division multiple access), LMDS (local multipoint distribution systems), MMDS (multi-channel-multi-point distribution systems), IrDA, Wireless USB, Z-Wave, ZigBee, and/or variations thereof.

Though a head unit device 110 of a vehicle may be modified to physically receive a non-OEM handheld mobile device 108, and may couple with a vehicle network on a wired and/or wireless basis, and may interoperate with vehicle OEM HMI devices, such as the OEM HMI device 104, the OEM HMI device 106, environmental OEM HMI devices 120, and other OEM HMI devices of a vehicle, as is discussed in detail with reference to FIGS. 2-6.

Figure 2:
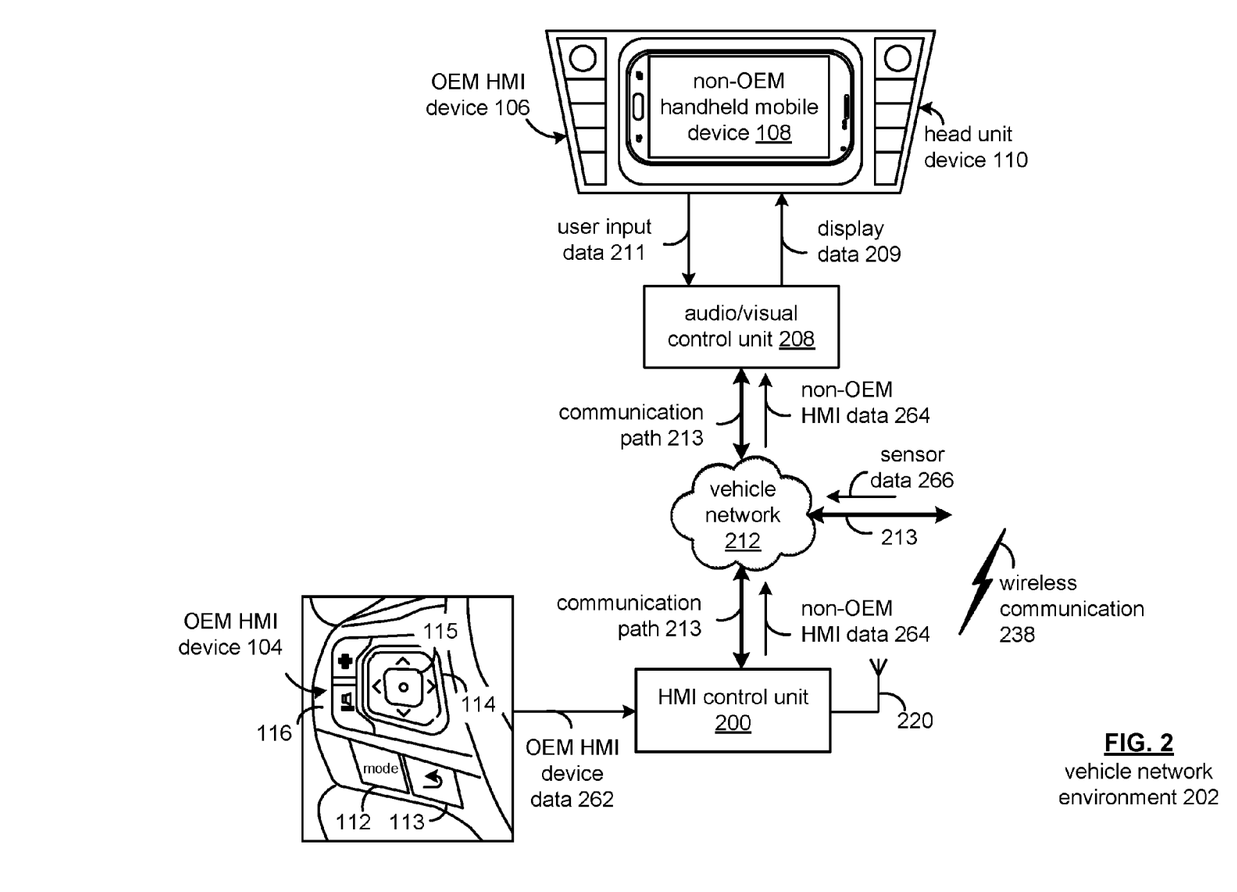
FIG. 2 shows an example of a block diagram of a human-machine interface (HMI) control unit in the context of a vehicle network environment.

Referring now to FIG. 2, provided is an example of a block diagram of the human-machine interface (HMI) control unit 200 in the context of a vehicle network environment 202. While the HMI control unit 200 is depicted in abstract with other vehicular components, the HMI control unit 200 may be combined with the system components of a vehicle.

The vehicle network environment 202 may include the HMI control unit 200 and an audio/visual control unit 208. Other examples of control units may generally include powertrain (such as engine, transmission, shaft, wheels, etc.), chassis (internal powertrain support, and brakes, steering, suspension, etc.), body-and-comfort (such as heating, air-conditioning, seat controls, window control, lights, etc.), driver assistance (such as in-vehicle navigation, cruise control, assisted parking and/or driving, autonomous driving, etc.), and the like.

The HMI control unit 200 may operate to facilitate interaction between humans and vehicle electronics. The HMI control unit 200 may operate to present information from vehicle devices and external devices in user-friendly and usable manner, permitting a driver and/or passenger to control the vehicle operations and infotainment system.

The HMI control unit 200 may couple to external devices via Bluetooth, Wi-Fi, and/or cellular networks, and may provide system diagnoses from sensor data 266, and otherwise be communicatively coupled to other vehicle control units, and may visually display information to a vehicle user via the head unit device 110, via the audio/visual control unit 208.

Control units communicatively coupled via a network 212 and communication paths 213. The HMI control unit 200 may communicate with a head unit device 110 via a communication path 213 and network 212, and may also communicate with a sensor control unit (not shown) to access sensor data 266. The HMI control unit 200 may also be wirelessly coupled with the non-OEM handheld mobile device 108 via the antenna 220 and wireless communication 238, as well as via a wireless communication generally to other handheld user devices (for example, cell phone, a smart phone, a personal digital assistant (PDA) devices, tablet computer, e-readers, etc.).

In this manner, the HMI control unit 200 operates to receive input data, such as OEM HMI device data 262, and in turn provide non-OEM HMI data 264, to the head unit device 110 via the audio/visual control unit 208. As may be appreciated, the HMI control unit 200 may also operate to provide non-OEM HMI data 264 to other devices that may communicatively couple via the network 212 on a wireless and/or wired basis.

Still referring to FIG. 2, the audio/visual control unit 208 operates to provide, for example, display data 209 (e.g., audio/visual data) for display, which in the present example is the non-OEM handheld mobile device 108, which operates to provide display functions for the head unit device 110.

The display data 209 and input data 211 may include audio data, audio/visual data, hands-free phone data, voice control data, navigation data, USB connection data, DVD play function data, multifunction meter function data, illumination signal data for the display (such as dimming control), driving status recognition data (such as vehicle speed, reverse, etc. via sensor data 266), composite image signal data (such as via LiDAR sensor devices, cameras, etc.).

The input data 211, received by the OEM HMI device 106, may be similarly converted and/or mapped to non-OEM HMI data 264 to affect operation of the non-OEM handheld mobile device 108. As may be further appreciated, non-OEM HMI data 264 may be provided via the user input data 211 by suitable touch screen technologies, for example, as a resistive touch screen, a surface acoustic wave touch screen, a capacitive touch screen, a surface capacitance touch screen, etc.

A touch screen of the device 108 operates to provide visual output or graphic user interfaces such as, for example, maps, navigation, entertainment, information, infotainment, and/or combinations thereof. The touch screen of the device 108 may include mediums capable of transmitting an optical and/or visual output such as, for example, a cathode ray tube, light emitting diodes, a liquid crystal display, a plasma display, or other two dimensional or three dimensional display that displays graphics, text or video in either monochrome or color in response to display data 209.

The head unit device 110 may also include tactile input and/or control inputs such that the communication path 213 communicatively couples the tactile input to other control units and/or modules of the vehicle. The tactile input data may provided by devices capable of transforming mechanical, optical, or electrical signals into a data signal capable of being transmitted via the communication path 213.

The tactile input of the non-OEM handheld mobile device 108 may include number of movable objects that each transform physical motion into a data signal that can be transmitted over the communication path 213 such as, for example, a button, a switch, a knob, a microphone, etc., for generating a HMI functional mapping assignment that corresponds with the user capability of the OEM HMI device 104, by way of example. Similar mappings may be generated with respect to other OEM HMI devices, such as device 106, 120, and the like.

The head unit device 110 may also operate to provide information regarding vehicle operation conditions based on display data 209 from the audio/visual control unit 208. Moreover, the graphics-based instrument cluster display, or may provide a such instrument cluster display to other monitor devices for the vehicle, such as a heads-up display (not shown), or to an instrument cluster in the vehicle dash assembly behind the vehicle steering wheel.

As may be appreciated, the communication path 213 of the vehicle network environment 202 may be formed by a medium suitable for transmitting a signal such as, for example, conductive wires, conductive traces, optical waveguides, or the like. Moreover, the communication paths 213 can be formed from a combination of mediums capable of transmitting signals.

The communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle.

As may be further appreciated, the communication path 213 may be provided under other network specifications, such as automotive Ethernet such as those developed under the IEEE 802.3, 802.1 and 1722 working groups, and as may also include audio video bridging over Ethernet (AVB), under IEEE 802.1Qat (Stream Reservation Protocol (SRP), IEEE 802.1Qav (Qav Queuing and Forwarding Protocol), etc.

The wireless communication 238 via the antenna 220 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

Figure 3:
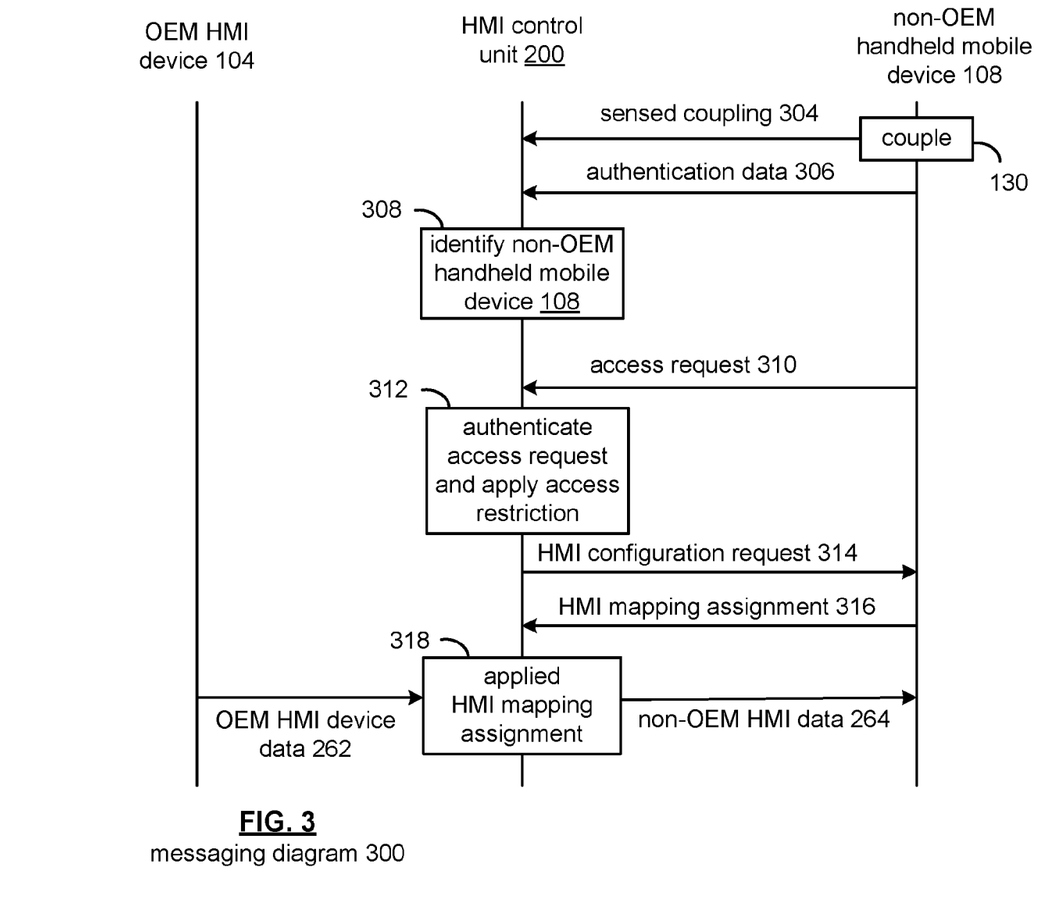
FIG. 3 shows a messaging diagram illustrating a protocol between a non-OEM handheld mobile device and a HMI control unit of FIG. 2.

Referring to FIG. 3, a messaging diagram 300 is illustrated. The messaging diagram shows messaging between HMI control unit 200 and a non-OEM handheld mobile device 108. Based upon the example protocol, interoperability may be provided between an original equipment manufacturer (OEM) human-machine interface (HMI) device 104 and a non-OEM handheld mobile device 108.

Initially, a non-OEM handheld mobile device 108 couples at 130 with a vehicle network 212 (see FIG. 2). The coupling may be a wired coupling and/or a wireless coupling. Examples of wired coupling are physical socket and/or pin receivers for the device 108 to the vehicle network 212, such as through a network interface, through various communication protocols, such as USB, Firewire (IEE 1394), etc. Examples of a wireless coupling may be via the antenna 220 of the HMI control unit 200 (see FIG. 2), through 802.11 communications (and variations thereof), Bluetooth, near-field communications (NFC), etc.

Upon sensing the coupling via messaging 304, the HMI control unit receives authentication data 306. The authentication data serves to identify the non-OEM handheld mobile device 108 at operation 308.

Identification of the device 108 may be provided by retrieving mobile device identification information through the wireless and/or wired coupling, and further by a near field communication (NFC) with the non-OEM handheld mobile device 108. The mobile device identification information may be in the form of a mobile station identification (MSID) data, a mobile identification number (MIN) data, an international mobile subscribe identity (IMSI) data, a manufacturer serial number data, etc.

The HMI control unit 200 receives an access request 310, and authenticates the access request 310 as provided by the non-OEM handheld mobile device 108. Upon authentication at 312, the HMI control unit 200 determines an access authority level to vehicle network, which may be an administrator access authority level (that is, full vehicle network data access, such as for testing at installer and/or vehicle assembly facilities), an owner access authority level (that is, moderate vehicle network data access), and/or a guest access authority level (that is, a low network data access for basic functionality).

As may be appreciated, the access request 310 may include a software license key. The software license key may be provided with an app purchase through the non-OEM handheld mobile device 108. A software license key provides a restricted license to access vehicle data and/or OEM HMI device data. The software license key may operate to provide for OEM HMI device 104 interoperability with a non-OEM handheld mobile device 108. The key may be a combination of the device number (such as identifiers for the non-OEM handheld mobile device 108) and some other information. Because the key is unique to the non-OEM handheld mobile device 108, it may not be transferred and/or used by other mobile devices.

Such access apps may be provided through third-party vendors, which in turn may be authorized resellers by a vehicle manufacture. Such licenses may include a number of seats, or vehicles, that the software license key may access, as well as provide additional services. Examples of additional services may include cloud storage of HMI mapping assignments related to a device 108, such that when the device 108 is relocated to other vehicles, the HMI mapping assignments may be pushed to a vehicle when the non-OEM handheld mobile device deployed.

In operation, the HMI control unit 200 transmits a human-machine interface (HMI) configuration request 314 that corresponds to the desired OEM HMI device, such as device 104, device 106, and/or devices 120.

As may be appreciated, OEM HMI devices of a vehicle may generally be mapped for accessibility and interoperability with the non-OEM handheld mobile device 108. For the example provided, the OEM HMI device 104 is discussed for clarity of the discussion herein.

The HMI configuration request 314 may provide a graphic user interface (GUI) data for display by the non-OEM handheld mobile device. In this example, the representation of the OEM HMI device 104 may be displayed on the non-OEM handheld mobile device 108, in which device inputs may be learned. For example, a volume control toggle input 116 may be graphically correlated with the volume control toggle input of the device 108, etc.

As may also be appreciated, the non-OEM handheld mobile device 108 may provide an HMI mapping assignment 316 with stored GUI data from earlier configuration activity. The non-OEM handheld mobile device 108 may confirm previously stored GUI data to base interoperability with the OEM HMI device. Also, the HMI control unit 200 may provide with the HMI configuration request default GUI data for confirmation of the non-OEM handheld mobile device. The default GUI data may also conform to the non-OEM handheld mobile device 108 for interoperability with the OEM HMI device 104.

As may be appreciated, other functions may be mapped to the GUI representation, such as a display scrolling function applied to the volume control toggle inputs 116 of the OEM HMI device 104.

The available mapping assignments are received by the HMI control unit 200 as a HMI mapping assignment 316. In the HMI mapping assignment 316, functional inputs of the non-OEM handheld mobile device 108 are mapped and/or correlated with the switch inputs of the OEM HMI device 104, which is discussed in further detail with reference to FIG. 4.

With the applied HMI mapping assignment 318, the HMI control unit 200 operates to receive OEM HMI device data 262 from the OEM HMI device 104, and produces non-OEM HMI data 264. The non-OEM HMI data 264 is provided to the device 108, which may be via the audio/visual control unit 208. The functional controls are then applied by the non-OEM handheld mobile device 108.

Figure 4:
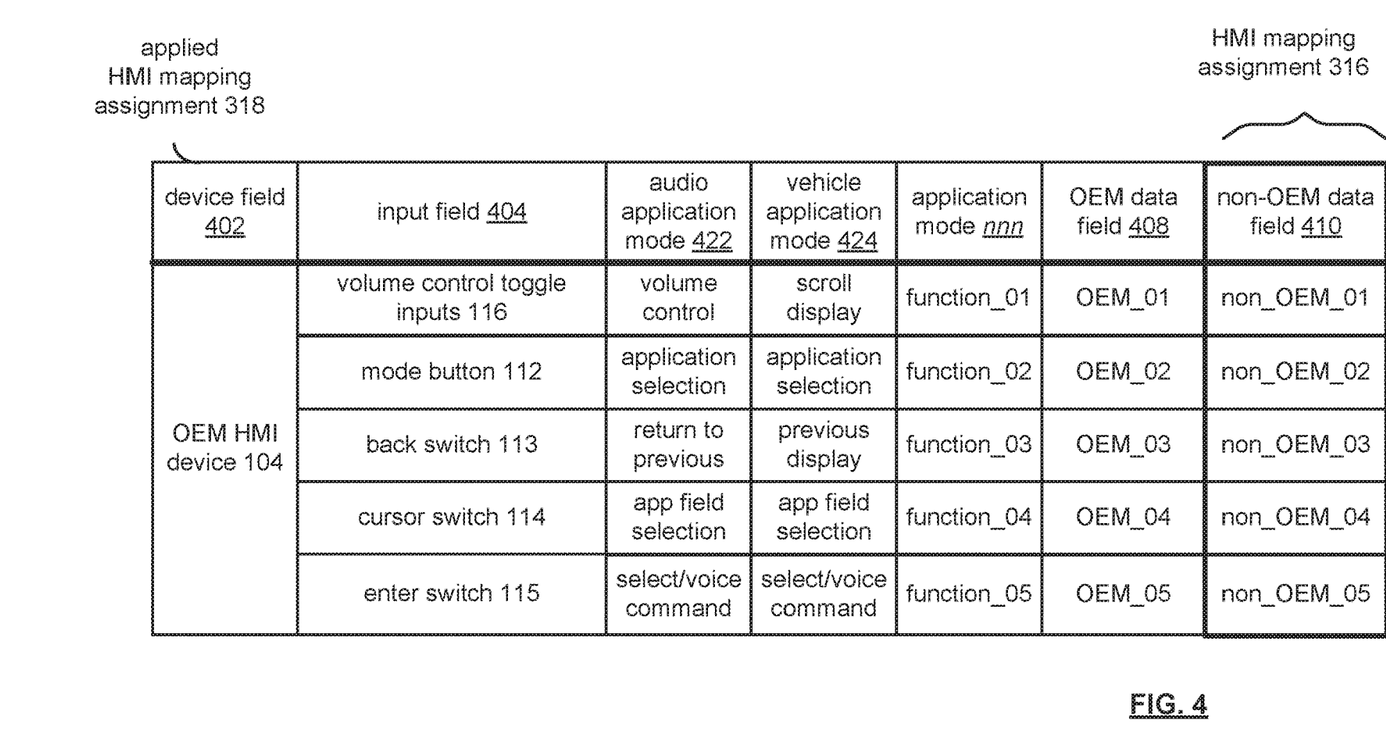
FIG. 4 shows an example of an applied HMI mapping assignment applying the OEM HMI device data with the functions of the non-OEM handheld mobile device of FIGS. 1-3.

FIG. 4 illustrates an example of an applied HMI mapping assignment 318 based on the OEM HMI device 104. The applied HMI mapping assignment 318 may be formed upon receiving an HMI mapping assignment 316 from a non-OEM handheld mobile device to provide interoperability with an OEM HMI device, such as devices 104, 106, and/or 120 (see FIG. 1).

As shown in FIG. 4, the applied HMI mapping assignment 318 may include a device field 402, an input field 404, and application fields (such as audio application mode 422, vehicle application mode 424, through application mode nnn.). During an HMI configuration, a vehicle user may designate applications that may selected via a mode button 112 of the OEM HMI device 104.

Application features may be controlled via the input fields 404 by the device set out by the device field 402, such as OEM HMI device 104. As an example, volume control toggle inputs 116 may for an audio application mode 422 increase or decrease audio volume within the vehicle. In a vehicle application mode 424, the volume control toggle inputs 116 may scroll the display to access various system information, such as fuel efficiency, tachometer data, speed data, engine temperature, etc.

In this manner, the inputs of the OEM HMI device 104 are provided functional actions, and the HMI control unit 200 may correlate the input data values in the corresponding OEM data field 408. The input data values in the OEM data field 408 are mapped with the non-OEM data values provided in the non-OEM data field 410.

As may be appreciated, the data communication between vehicle devices may be encrypted (such as at a network transfer layer below the application layer, but above the data link layer). Such encryption may further secure the data network from unintentional access, while providing a vehicle user functional operation of the non-OEM handheld mobile device 108 with the OEM HMI device 104.

Figure 5:
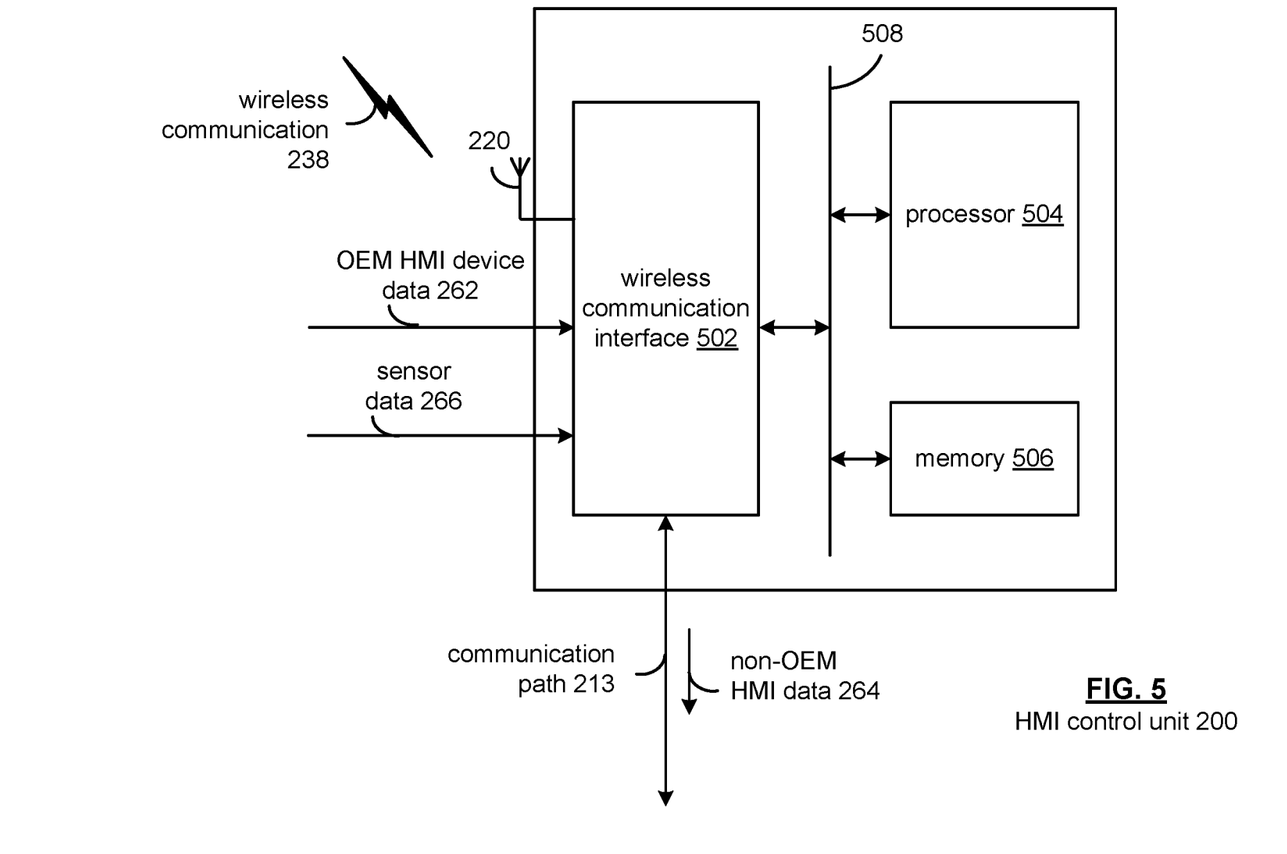
FIG. 5 is a block diagram of a HMI control unit of FIG. 2.

FIG. 5 is a block diagram of a HMI control unit 200, which includes a wireless communication interface 502, a processor 504, and memory 506, that are communicatively coupled via a bus 508.

The processor 504 in the HMI control unit 200 can be a conventional central processing unit or any other type of device, or multiple devices, capable of manipulating or processing information. As may be appreciated, processor 504 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory 506 and/or memory element may be a single memory device, a plurality of memory devices, and/or embedded circuitry of the processor 504. Such a memory device may be a read-only memory, random access memory, volatile memory, non-volatile memory, static memory, dynamic memory, flash memory, cache memory, and/or any device that stores digital information. The memory 506 is capable of storing machine readable instructions such that the machine readable instructions can be accessed by the processor 504. The machine readable instructions can comprise logic or algorithm(s) written in programming languages, and generations thereof, (e.g., 1GL, 2GL, 3GL, 4GL, or 5GL) such as, for example, machine language that may be directly executed by the processor 504, or assembly language, object-oriented programming (OOP), scripting languages, microcode, etc., that may be compiled or assembled into machine readable instructions and stored on the memory 506. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 504 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 504 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 504 executes, hard coded and/or operational instructions corresponding to at least some of the steps and/or functions illustrated in FIGS. 1-6 to assess a nature of a vehicle acceleration and to provide near real-time feedback features and methods described herein.

The wireless communications interface 502 generally governs and manages the vehicle user input data via the vehicle network 212 over the communication path 213 and/or wireless communication 238. The wireless communication interface 502 also manages controller unit output data such as display data and/or vehicle status data to the vehicle user. There is no restriction on the present disclosure operating on any particular hardware arrangement and therefore the basic features herein may be substituted, removed, added to, or otherwise modified for improved hardware and/or firmware arrangements as they may develop.

The sensor data 266 (see FIG. 2) includes capturing of intensity or reflectivity returns of the environment surrounding the vehicle, instantaneous vehicle speed data, and acceleration data for determining acceleration state for providing feedback to improve vehicle fuel efficiency. In general, the sensor data 266 captured by the vehicle sensors may be used by one or more of applications of the non-OEM handheld mobile device 108.

The antenna 220, with the wireless communications interface 502, operates to provide wireless communications with the HMI control unit 200, including wireless communication 238.

Such wireless communications range from national and/or international cellular telephone systems to the Internet to point-to-point in-home wireless networks to radio frequency identification (RFID) and/or near field communication (NFC) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the HMI control unit 200 may also be used as an acceptable architecture of the audio/visual control unit 208, and/or other control units that may be implemented with the vehicle network environment 202. Each control unit may include a communication interface or a wireless communication interface, a processor, and memory that may be communicatively coupled via a data bus. As may be appreciated, other architectures may be implemented, with similar functional capabilities.

The processors for the other control units may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the control units, for example, may be a single memory device, a plurality of memory devices, and/or embedded circuitry of the processor related to the control unit. Such a memory device may be a read-only memory, random access memory, volatile memory, non-volatile memory, static memory, dynamic memory, flash memory, cache memory, and/or any device that stores digital information.

Note that if the processor for each of the control units, etc., includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor for each of the control units may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory stores, and the processor executes, hard coded and/or operational instructions corresponding to at least some of the steps and/or functions illustrated in FIGS. 1-6 to perform vehicle fuel efficiency operations responsive to an altered vehicle surface and methods described herein.

There is no restriction on the present disclosure operating on any particular hardware arrangement and therefore the basic features herein may be substituted, removed, added to, or otherwise modified for improved hardware and/or firmware arrangements as they may develop.

Figure 6:
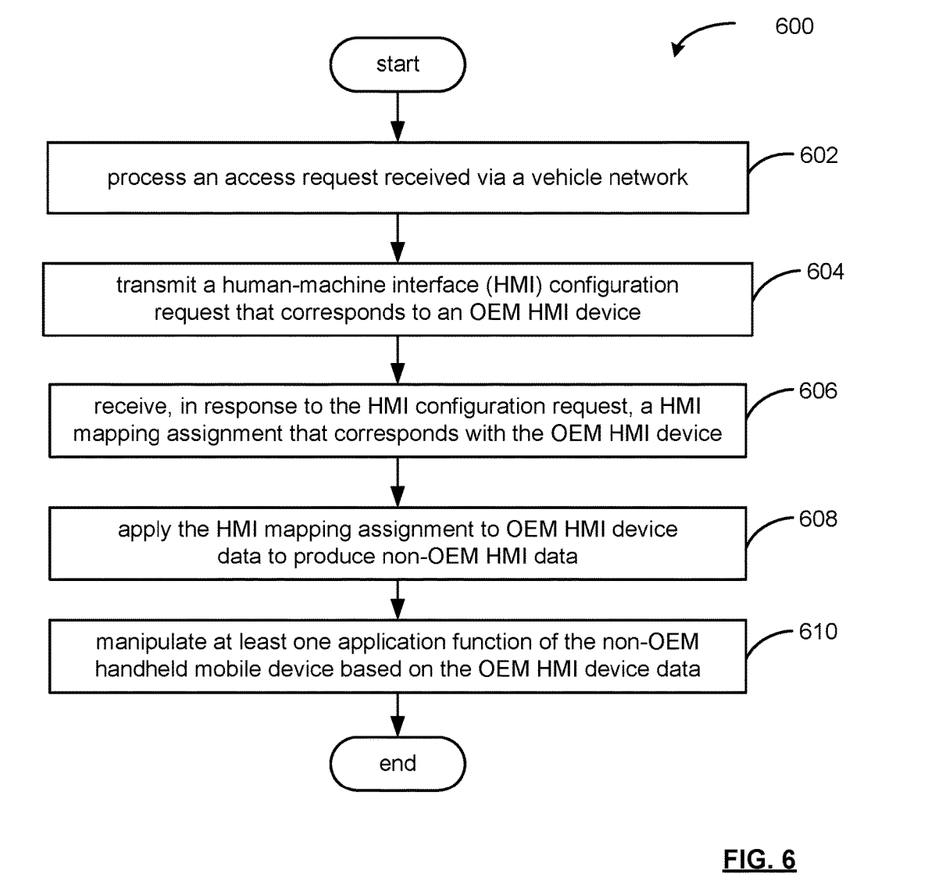
FIG. 6 shows an example process for providing original equipment manufacturer (OEM) human-machine interface (HMI) device operation of a non-OEM handheld mobile device.

FIG. 6 is an example process 600 in a HMI control unit 200 for providing interoperability and/or operation by an original equipment manufacturer (OEM) human-machine interface (HMI) device 104 of a non-OEM handheld mobile device 108 (see, e.g., FIGS. 1-5).

Initially, a non-OEM handheld mobile device couples with a vehicle network 212 (see FIG. 2). The coupling may be a wired coupling and/or a wireless coupling. Examples of wired coupling are physical socket and/or pin receivers for the device 108 to the vehicle network 212, such as through a network interface, through various communication protocols, such as USB, Firewire (IEE 1394), etc. Examples of a wireless coupling may be via the antenna 220 of the HMI control unit 200 (see FIG. 2), through 802.11 communications (and variations thereof), Bluetooth, near-field communications (NFC), etc.

Upon sensing the coupling by the device 108, the HMI control unit 200 may receive authentication data. The authentication data serves to identify the non-OEM handheld mobile device 108 to the HMI control unit 200. The device 108 may be identified by retrieving mobile device identification information through the wireless and/or wired coupling, and/or further by a near field communication (NFC) with the non-OEM handheld mobile device 108. The mobile device identification information may be in the form of a mobile station identification (MSID) data, a mobile identification number (MIN) data, an international mobile subscribe identity (IMSI) data, a manufacturer serial number data, etc.

The HMI control unit 200 receives an access request at operation 602. Upon authentication, the HMI control unit 200 may determines an access authority level to vehicle network 212, which may be an administrator access authority level (that is, full vehicle network data access, such as for testing at installer and/or vehicle assembly facilities), an owner access authority level (that is, moderate vehicle network data access), and/or a guest access authority level (that is, a low network data access for basic functionality).

As may be appreciated, the access request may include a software license key. The software license key may be provided with an app purchase through the non-OEM handheld mobile device 108 (see FIG. 1). A software license key provides a restricted license to access vehicle data and/or OEM HMI device data. The software license key may operate to provide for OEM HMI device 104 interoperability with a non-OEM handheld mobile device 108. The key may be a combination of the device number (such as identifiers for the non-OEM handheld mobile device 108) and some other information. Because the key is unique to the non-OEM handheld mobile device 108, it may not be transferred and/or used by other mobile devices.

Such access apps may be provided through third-party vendors, which in turn may be authorized resellers by a vehicle manufacture. Such licenses may include a number of seats, or vehicles, that the software license key may access, as well as provide additional services. Examples of additional services may include cloud storage of HMI mapping assignments related to a device 108, such that when the device 108 is relocated to other vehicles, the HMI mapping assignments may be pushed to a vehicle when the non-OEM handheld mobile device deployed.

In operation, the HMI control unit 200 transmits a human-machine interface (HMI) configuration request at operation 606. The HMI configuration request corresponds to the desired OEM HMI device, such as device 104, device 106, and/or devices 120 (see FIG. 1).

As may be appreciated, OEM HMI devices of a vehicle may generally be mapped for accessibility and interoperability with the non-OEM handheld mobile device 108.

The HMI configuration request at operation 604 may provide a graphic user interface (GUI) data for display by the non-OEM handheld mobile device. In this example, the representation of the OEM HMI device 104 may be displayed on the non-OEM handheld mobile device 108, in which device inputs may be learned. For example, a volume control toggle input 116 may be graphically correlated with the volume control toggle input of the device 108, etc.

As may also be appreciated, the non-OEM handheld mobile device 108 may provide an HMI mapping assignment with stored GUI data from earlier configuration activity. The non-OEM handheld mobile device 108 may simply confirm the prior stored GUI data to base interoperability with the OEM HMI device. Also, the HMI control unit 200 may provide with the HMI configuration request default GUI data, which may also be conformed to the non-OEM handheld mobile device 108 for interoperability with the OEM HMI device 104.

As may be appreciated, other functions may be mapped to the GUI representation, such as a display scrolling function applied to the volume control toggle inputs 116 of the OEM HMI device 104.

The available mapping assignments are received by the HMI control unit 200 as a HMI mapping assignment at operation 606. In the HMI mapping assignment, functional inputs of the non-OEM handheld mobile device 108 are mapped and/or correlated with the switch inputs of the OEM HMI device 104 (see FIG. 4).

With the applied HMI mapping assignment, the HMI control unit 200 at operation 608 operates to receive OEM HMI device data from the OEM HMI device 104, and produces non-OEM HMI data. At operation 610, the non-OEM HMI data may be provided to the device 108 to manipulate at least one application function of the non-OEM handheld mobile device based on the OEM HMI device data.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein a device apparatus and method, as well as several embodiments including a preferred embodiment, for implementing functional interoperability by a vehicle human-machine interface (HMI) device with a handheld mobile device.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for providing original equipment manufacturer (OEM) human-machine interface (HMI) device operation of a non-OEM handheld mobile device, the method comprising:
    processing an access request received via a vehicle network;
    transmitting, in response to the access request, a human-machine interface (HMI) configuration request that corresponds to the OEM HMI device;
    receiving, in response to the HMI configuration request, a HMI mapping assignment that corresponds with the OEM HMI device; and
    applying the HMI mapping assignment to OEM HMI device data to produce non-OEM HMI data, wherein the OEM HMI device data being operable to manipulate at least one application function of the non-OEM handheld mobile device.

2. The method of claim 1, further comprising:
    sensing either of a wireless coupling and a wired coupling of the non-OEM handheld mobile device with the vehicle network; and
    upon the sensing the either of the wireless coupling and the wired coupling of the non-OEM handheld mobile device with the vehicle network:
        receiving authentication data to identify the non-OEM handheld mobile device; and
        identifying the non-OEM handheld mobile device.

3. The method of claim 2, wherein the identifying further comprising:
    retrieving mobile device identification information from the non-OEM handheld mobile device.

4. The method claim 3, wherein the retrieving the mobile device identification information is based on a near field communication (NFC) with the non-OEM handheld mobile device.

5. The method of claim 4, wherein the mobile device identification information including at least one of:
    a mobile station identification (MSID) data;
    a mobile identification number (MIN) data;
    an international mobile subscribe identity (IMSI) data; and
    manufacturer serial number data.

6. The method of claim 1, further comprising:
    authenticating the access request; and
    when the access request is authenticated,
        determining an access authority level to data on the vehicle network; and
        restricting access to the data on the vehicle network based on the access authority level.

7. The method of claim 1, wherein the access request comprising a software license key.

8. A method for providing original equipment manufacturer (OEM) human-machine interface (HMI) device connectivity with a non-OEM handheld mobile device, the method comprising:
    coupling the non-OEM handheld mobile device with a vehicle network;
    transmitting, by the non-OEM handheld mobile device via the vehicle network, an access data request, wherein the access data request including authentication data to authenticate access by the non-OEM handheld mobile device to vehicle network data;

receiving, in response to the access data request, a human-machine interface (HMI) configuration request based on a user input capability of the OEM HMI device; and transmitting, in response to the HMI configuration request, a HMI functional mapping assignment that corresponds with the user input capability of the OEM HMI device, wherein the OEM HMI device being operable to manipulate at least one application function of the non-OEM handheld mobile device.

9. The method of claim 8, wherein the coupling comprising either of a wireless coupling and a wired coupling of the non-OEM handheld mobile device with the vehicle network.

10. The method of claim 8, wherein the access data request indicating an access authority level by the non-OEM handheld mobile device to the vehicle network data.

11. The method of claim 8, wherein the authentication data further comprising at least one of:
a mobile station identification (MSID) data;
a mobile identification number (MIN) data;
an international mobile subscribe identity (IMSI) data; and
manufacturer serial number data.

12. The method of claim 8, wherein the HMI configuration request comprising at least one of:
graphic user interface (GUI) data for display of the non-OEM handheld mobile device;
stored GUI data for confirmation of the non-OEM handheld mobile device; and
default GUI data for confirmation of the non-OEM handheld mobile device.

13. The method of claim 8, wherein the access data request comprising a software license key.

14. A human machine interface (HMI) control unit comprising:
a wireless communication interface to service communication with a vehicle network;
a processor coupled to the wireless communication interface, the processor for controlling operations of the HMI control unit; and
a memory coupled to the processor, the memory for storing data and program instructions used by the processor, wherein the processor being configured to execute instructions stored in the memory to:
receive an access request via the vehicle network;
transmit, in response to the access request, a human-machine interface (HMI) configuration request that corresponds to an original equipment manufacturer (OEM) human machine interface (HMI) device;
receive, in response to the HMI configuration request, an HMI mapping assignment that corresponds with the OEM HMI device; and
apply the HMI mapping assignment to OEM HMI device data, wherein the OEM HMI device data being operable to manipulate at least one application function of a non-OEM handheld mobile device.

15. The HMI control unit of claim 14, wherein the processor being further configured to execute further instructions stored in the memory to process the access request by:
sensing either of a wireless coupling and a wired coupling of the non-OEM handheld mobile device with the vehicle network; and
upon the sensing the either of the wireless coupling and the wired coupling of the non-OEM handheld mobile device with the vehicle network:
receiving authentication data to identify the non-OEM handheld mobile device; and
identifying the non-OEM handheld mobile device.

16. The HMI control unit of claim 15, wherein the processor being further configured to execute further instructions stored in the memory to:
authenticate the access request; and
when the access request is authenticated:
determine an access authority level for the non-OEM handheld mobile device to vehicle network data, wherein the access authority level includes at least one of an administrator access authority level, an owner access authority level, and a guest access authority level; and
provide access to the vehicle network data by the non-OEM handheld mobile device based on the access authority level.

17. The HMI control unit of claim 16, wherein the processor being further configured to execute further instructions stored in the memory to authenticate the access request by:
retrieving mobile device identification information from the non-OEM handheld mobile device.

18. The HMI control unit of claim 17, wherein the retrieving the mobile device identification information being based on a near field communication (NFC) with the non-OEM handheld mobile device.

19. The HMI control unit of claim 18, wherein the mobile device identification information including at least one of:
a mobile station identification (MSID) data;
a mobile identification number (MIN) data;
an international mobile subscribe identity (IMSI) data; and
manufacturer serial number data.

20. The HMI control unit of claim 14, wherein the access request comprising a software license key.

* * * * *